(12) United States Patent
Wei et al.

(10) Patent No.: US 12,156,223 B2
(45) Date of Patent: Nov. 26, 2024

(54) DYNAMIC RESOURCE MULTIPLEXING

(71) Applicant: QUALCOMM Incorporated, San Diego, CA (US)

(72) Inventors: Chao Wei, Beijing (CN); Wanshi Chen, San Diego, CA (US); Hao Xu, Beijing (CN)

(73) Assignee: QUALCOMM Incorporated, San Diego, CA (US)

(*) Notice: Subject to any disclaimer, the term of this patent is extended or adjusted under 35 U.S.C. 154(b) by 184 days.

(21) Appl. No.: 17/262,173

(22) PCT Filed: Aug. 8, 2019

(86) PCT No.: PCT/CN2019/099711
§ 371 (c)(1),
(2) Date: Jan. 21, 2021

(87) PCT Pub. No.: WO2020/030027
PCT Pub. Date: Feb. 13, 2020

(65) Prior Publication Data
US 2021/0360592 A1 Nov. 18, 2021

(30) Foreign Application Priority Data
Aug. 10, 2018 (WO) ............... PCT/CN2018/099814

(51) Int. Cl.
*H04W 72/23* (2023.01)
*H04L 5/00* (2006.01)
(Continued)

(52) U.S. Cl.
CPC .......... *H04W 72/23* (2023.01); *H04L 5/0092* (2013.01); *H04L 5/1469* (2013.01);
(Continued)

(58) Field of Classification Search
CPC ............... H04W 72/042; H04W 48/12; H04W 72/0446; H04W 72/0453; H04W 72/048; H04W 92/18; H04L 5/0092; H04L 5/1469
See application file for complete search history.

(56) References Cited

U.S. PATENT DOCUMENTS

2014/0269539 A1* 9/2014 Yin ....................... H04L 5/0092
370/329
2014/0376460 A1* 12/2014 Hooli .................... H04W 72/23
370/329
(Continued)

FOREIGN PATENT DOCUMENTS

CN 107078990 A 8/2017
EP 3846570 A1 7/2021
(Continued)

OTHER PUBLICATIONS

Changhwan Park, "Flexible UL/DL Configuration for NB-IoT", Aug. 10, 2017, U.S. Appl. No. 62/543,936 (Year: 2017).*
(Continued)

*Primary Examiner* — Joseph E Avellino
*Assistant Examiner* — Charles E Eckholdt
(74) *Attorney, Agent, or Firm* — Procopio, Cory, Hargreaves & Savitch LLP

(57) ABSTRACT

The present disclosure relates to methods and devices for dynamic resource multiplexing. In one aspect, a base station can transmit a first uplink/downlink configuration for communicating with one or more User Equipments (UEs). The first uplink/downlink configuration can comprise a set of fixed resources configured for uplink communication without downlink resources for downlink communication or for downlink communication without uplink resources for uplink communication. The base station can also transmit a second uplink/downlink configuration for communicating with the one or more UEs. The second configuration can
(Continued)

comprise a flexible resource configuration. Additionally, the base station can communicate with a least one of the one or more UEs based on the first uplink/downlink configuration or the second uplink/downlink configuration.

30 Claims, 16 Drawing Sheets

(51) Int. Cl.
*H04L 5/14* (2006.01)
*H04W 48/12* (2009.01)
*H04W 72/0446* (2023.01)
*H04W 72/0453* (2023.01)
*H04W 72/1263* (2023.01)
*H04W 72/51* (2023.01)
*H04W 92/18* (2009.01)

(52) U.S. Cl.
CPC ........ *H04W 72/1263* (2013.01); *H04W 48/12* (2013.01); *H04W 72/0446* (2013.01); *H04W 72/0453* (2013.01); *H04W 72/51* (2023.01); *H04W 92/18* (2013.01)

(56) References Cited

U.S. PATENT DOCUMENTS

| | | | | |
|---|---|---|---|---|
| 2016/0182211 | A1* | 6/2016 | Choi | H04L 5/1469 370/280 |
| 2016/0248553 | A1* | 8/2016 | Shimezawa | H04L 5/0053 |
| 2016/0380742 | A1* | 12/2016 | Suzuki | H04L 5/1469 370/280 |
| 2017/0027015 | A1 | 1/2017 | Wijesinghe et al. | |
| 2017/0156140 | A1 | 6/2017 | Islam et al. | |
| 2017/0181143 | A1* | 6/2017 | Kim | H04L 7/0337 |
| 2017/0311319 | A1* | 10/2017 | Lee | H04L 1/1822 |
| 2018/0049151 | A1* | 2/2018 | Yoon | G01S 5/0036 |
| 2018/0234966 | A1* | 8/2018 | Somichetty | H04L 5/0092 |
| 2018/0234998 | A1* | 8/2018 | You | H04W 72/1273 |
| 2020/0221481 | A1* | 7/2020 | Park | H04W 72/0466 |
| 2020/0383144 | A1* | 12/2020 | Sun | H04W 74/0833 |
| 2022/0150978 | A1* | 5/2022 | Sun | H04W 80/02 |

FOREIGN PATENT DOCUMENTS

| | | | |
|---|---|---|---|
| WO | 2017129075 | A1 | 8/2017 |
| WO | 2017188733 | A1 | 11/2017 |
| WO | 2018097680 | A1 | 5/2018 |

OTHER PUBLICATIONS

Ericsson: "New WID on Rel-16 MTC Enhancements for LTE", RP-181450, 3GPP TSG RAN Meeting #80, La Jolla, USA, Jun. 11-14, 2018, Jun. 14, 2018, 4 Pages.

Huawei, et al., "Dynamic Resource Multiplexing of Downlink Control and Data", 3GPP TSG RAN WG1 NR Ad Hoc Meeting Draft; R1-1700397, vol. RAN WG1, No. Spokane, USA; Jan. 16, 2017-Jan. 20, 2017, Jan. 16, 2017 (Jan. 16, 2017), 3 Pages, XP051207934.

International Search Report and Written Opinion—PCT/CN2018/099814—ISA/EPO—May 13, 2019.

International Search Report and Written Opinion—PCT/CN2019/099711—ISA/EPO—Nov. 18, 2019.

Supplementary European Search Report—EP19847331—Search Authority—The Hague—Apr. 11, 2022 (10 pages).

* cited by examiner

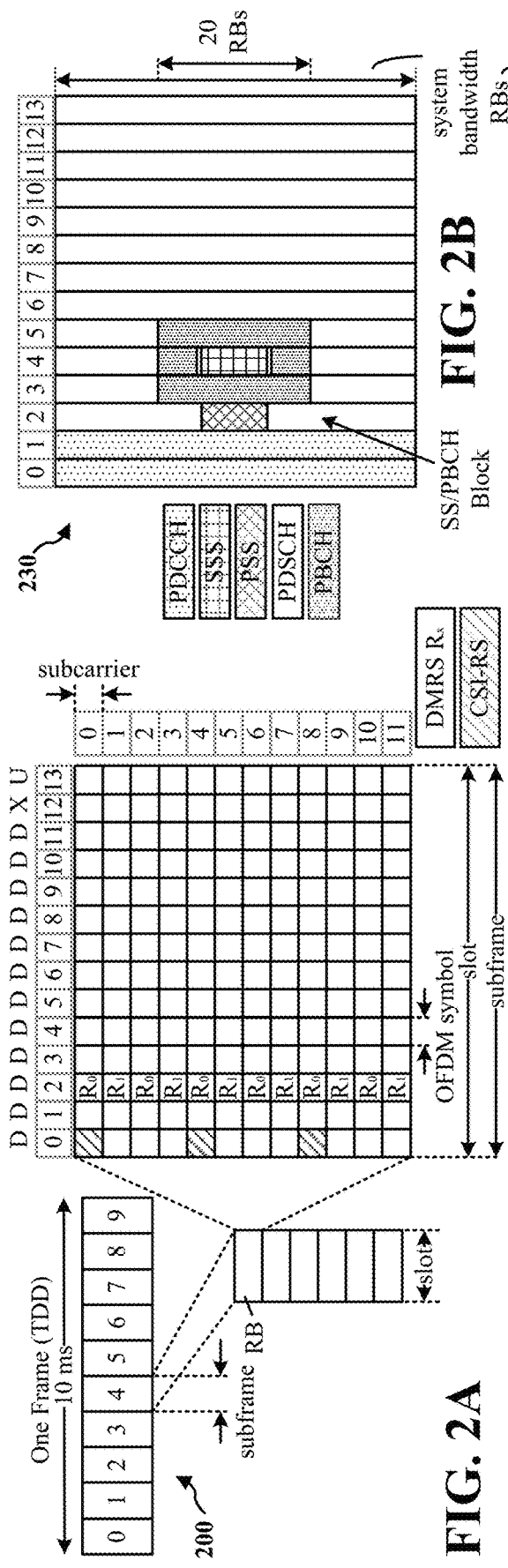
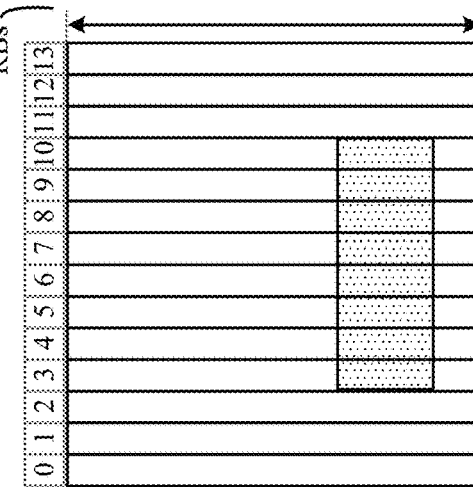
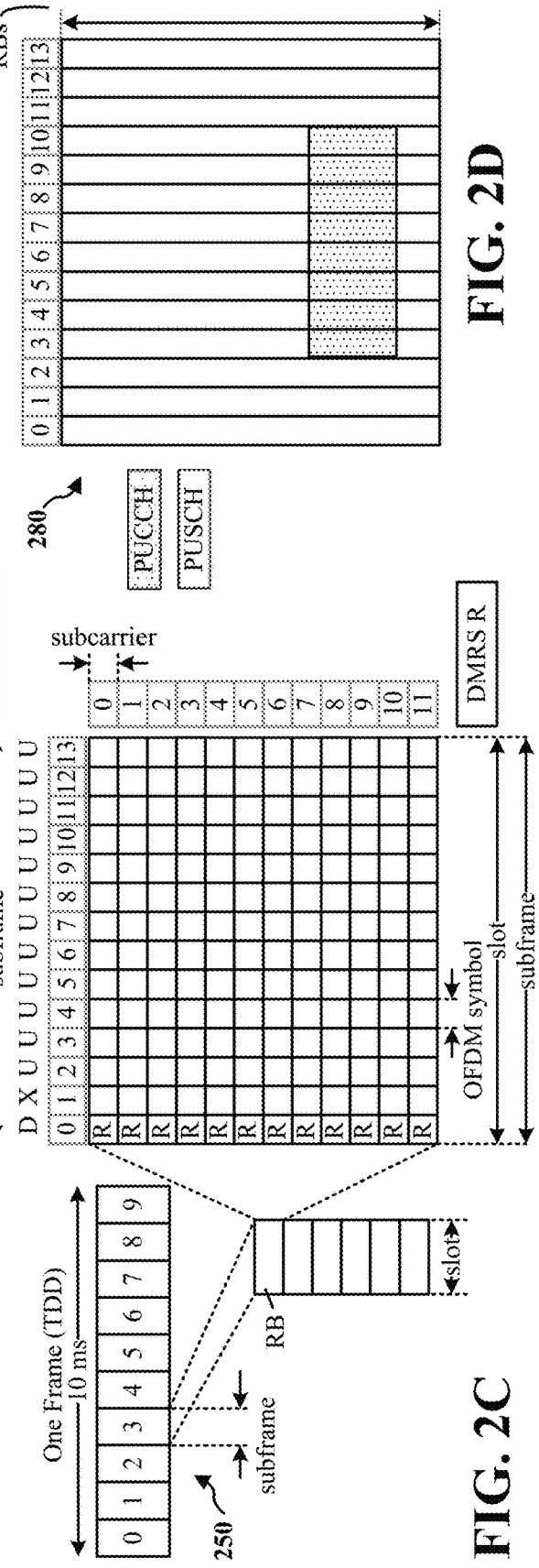
FIG. 2A
FIG. 2B
FIG. 2C
FIG. 2D

| LTE subframe 9 (DL) | LTE subframe 0 (DL) | LTE subframe 1 (special) | LTE subframe 2 (UL) | LTE subframe 3 (UL) |
|---|---|---|---|---|
| NR slot 0 | NR slot 1 | NR slot 2 | NR slot 3 | NR slot 4 | NR slot 5 | NR slot 6 | NR slot 7 | NR slot 8 | NR slot 9 |

TDD configuration for NR assuming 30kHz SCS (DL/UL Transmission Periodicity=5ms, light gray=DL; white=GP and dark gray=UL)

FIG. 7

DYNAMIC RESOURCE MULTIPLEXING

CROSS REFERENCE TO RELATED APPLICATION(S)

This application is a National Stage Application filed under 35 U.S.C. § 371 of PCT International Patent Application Serial No. PCT/CN2019/099711, entitled "DYNAMIC RESOURCE MULTIPLEXING", and filed on Aug. 8, 2019, which claims the benefit of International Application No. PCT/CN2018/099814, entitled "DYNAMIC RESOURCE MULTIPLEXING" and filed on Aug. 10, 2018, each of which is expressly incorporated by reference herein in its entirety.

TECHNICAL FIELD

The present disclosure relates generally to communication systems, and more particularly, to a methods and apparatus related to multiplexing resources.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Communication between a base station and a user equipment (UE) can include different types of data that is transmitted and/or received by the base station or UE. During transmission and/or reception, this data can be multiplexed over one or more resources. Presently, there exists a need to provide new and improved resource multiplexing.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Wireless resources may need to be used in a manner that enables coexistence between LTE enhanced Machine Type Communication (eMTC) and narrowband IoT (NB-IoT) with 5G NR communication. A semi-static resource partition may lead to inefficient resource utilisation. Aspects presented herein provide dynamic multiplexing of at least some resources for the transmission and/or reception of data in a manner that enables a more efficient use of wireless resources between eMTC/NB-IoT and NR.

In an aspect of the disclosure, a method, a computer-readable medium, and an apparatus are provided for wireless communication at a base station. The apparatus can transmit a first uplink/downlink configuration for communicating with one or more UEs. The first uplink/downlink configuration can comprise a set of fixed resources configured for uplink communication without downlink resources for downlink communication or for downlink communication without uplink resources for uplink communication. The apparatus can also transmit a second uplink/downlink configuration for communicating with the one or more UEs. The second configuration may comprise a flexible resource configuration. In addition, the apparatus can communicate with a least one of the one or more UEs based on the first uplink/downlink configuration or the second uplink/downlink configuration.

In a further aspect of the disclosure, a method, a computer-readable medium, and an apparatus are provided for wireless communication at a UE. The apparatus can receive, from a base station, a first uplink/downlink configuration for a set of fixed resources configured for uplink communication without downlink resources for downlink communication or for downlink communication without uplink resource for uplink communication. The apparatus can also receive, from the base station, a second uplink/downlink configuration comprising one or more flexible resources. Additionally, the apparatus can communicate with the base station using the first the first uplink/downlink configuration or the second uplink/downlink configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 7 displays another example of resource multiplexing according to the present disclosure.

DETAILED DESCRIPTION

Figure 1:
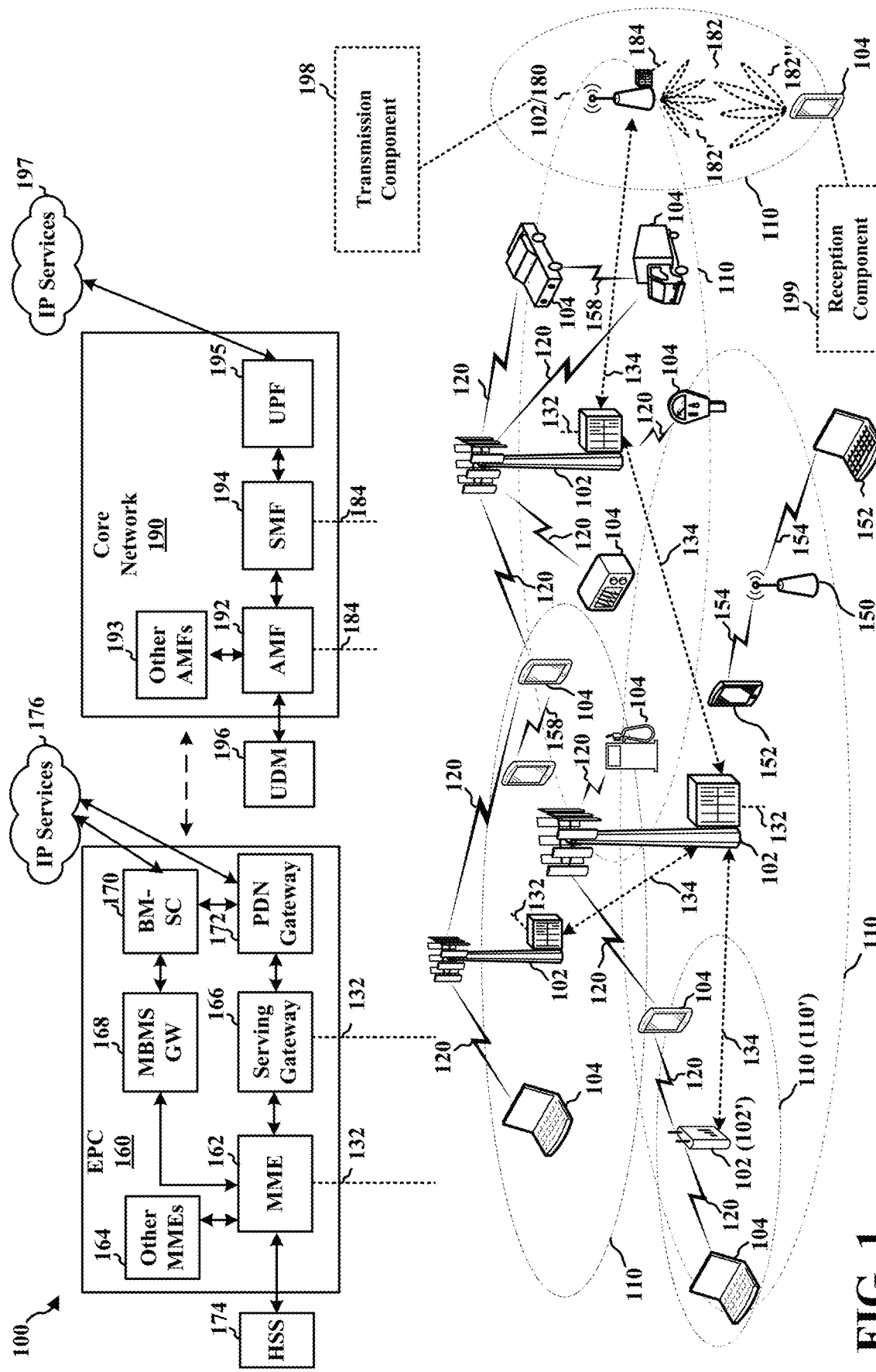
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may include a transmission component 198 configured to transmit a first uplink/downlink configuration for communicating with one or more UEs, where the first uplink/downlink configuration can comprise a set of fixed resources configured for uplink communication without downlink resources for downlink communication or for downlink communication without uplink resources for uplink communication. Transmission component 198 may also be configured to transmit a second uplink/downlink configuration for communicating with the one or more UEs, where the second configuration can comprise a flexible resource configuration. Transmission component 198 may also be configured to communicate with a least one of the one or more UEs based on the first uplink/downlink configuration or the second uplink/downlink configuration.

Additionally, UE 104 may include a reception component 199 configured to receive, from a base station, a first uplink/downlink configuration for a set of fixed resources configured for uplink communication without downlink resources for downlink communication or for downlink communication without uplink resource for uplink communication. Reception component 199 may also be configured to receive, from the base station, a second uplink/downlink configuration comprising one or more flexible resources. Reception component 199 may also be configured to communicate with the base station using the first the first uplink/downlink configuration or the second uplink/downlink configuration. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology there are 14 symbols/slot and $2^{11}$ slots/subframe. The subcarrier spacing and symbol length/duration are a function of the numerology. The subcarrier spacing may be equal to $2^{\mu}*15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100 × is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
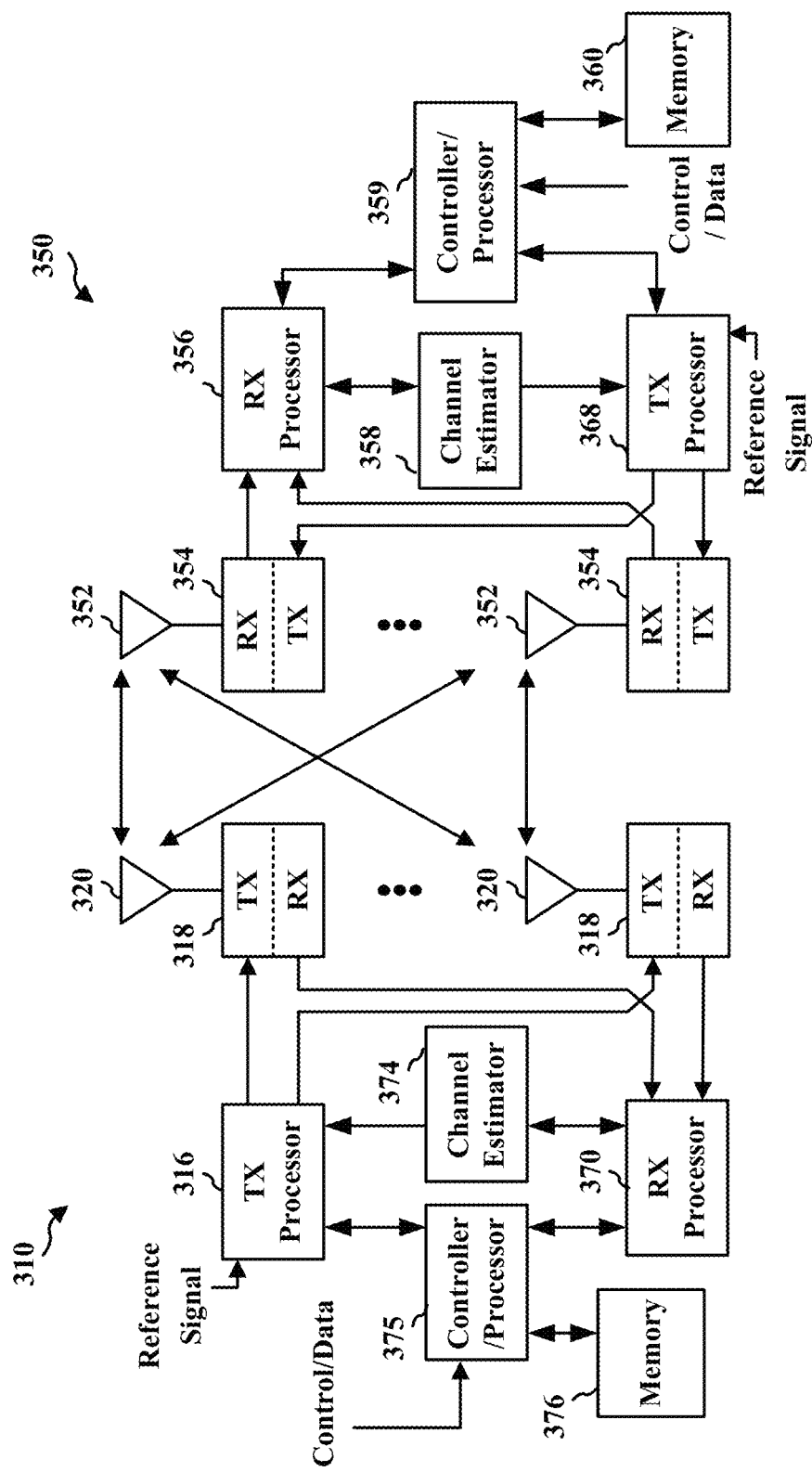
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 199 of FIG. 1.

At least one of the TX processor 316, the RX processor 370, and the controller/processor 375 may be configured to perform aspects in connection with 198 of FIG. 1.

Figure 4:
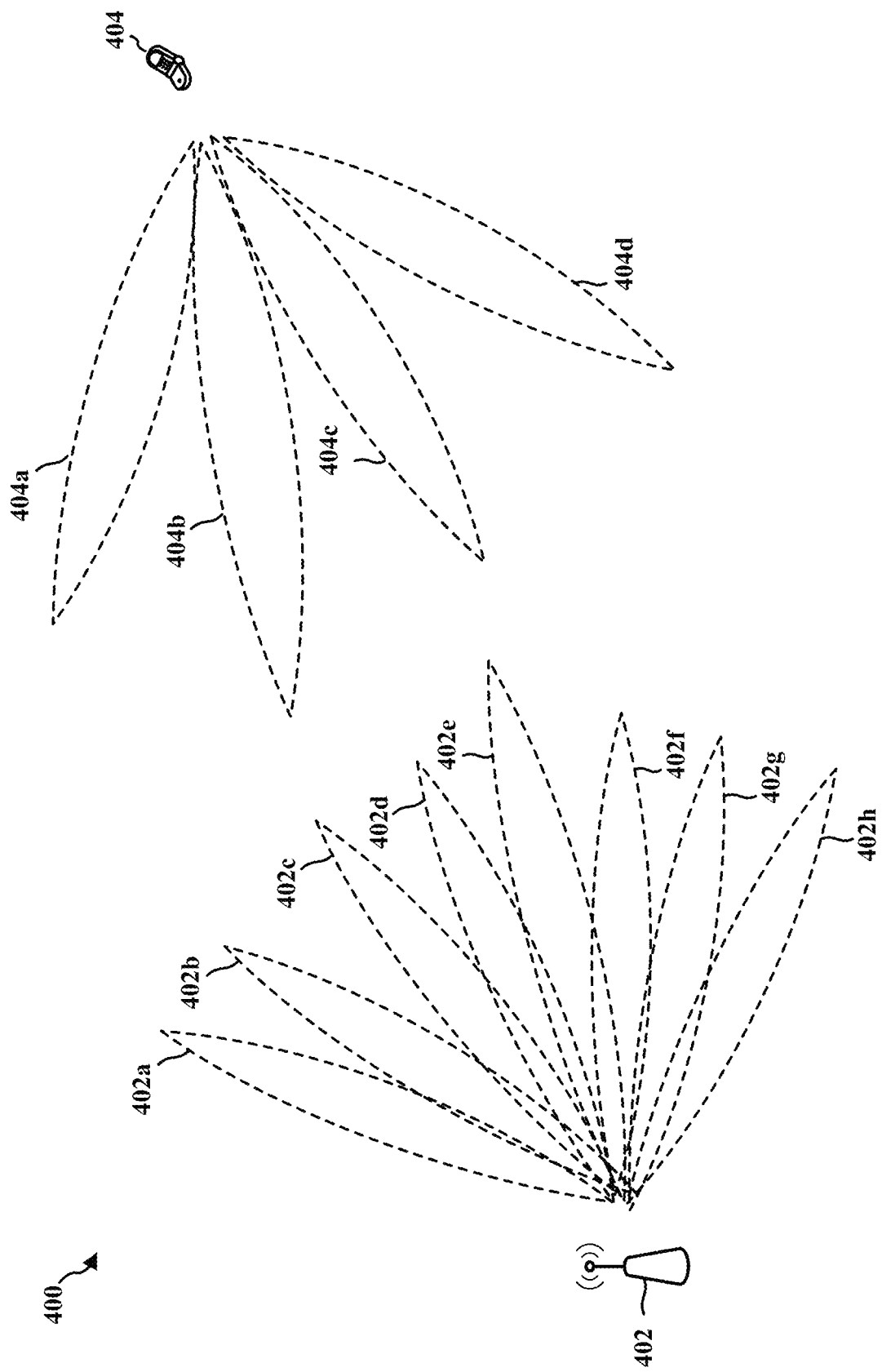
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

In wireless communications, e.g., Millimeter Wave (mmW) wireless communication, base stations and UEs can transmit and/or receive a multitude of data between each other. Such data can be multiplexed over one or more resources. In some instances, the data multiplexed over these resources can become too concentrated in certain resources. As such, it can be advantageous and efficient to use dynamic multiplexing of at least some resources for the transmission and/or reception of data. For instance, dynamic multiplexing resources can help to better transmit and/or receive the data.

In some aspects of the present disclosure, there can be a coexistence of different types of wireless communications, e.g., communication based on a first radio access technology (RAT) and communication based on a second RAT. For example, in some aspects, the present disclosure can help to enable the coexistence of LTE communications and NR communications. The coexistence of communication based on multiple RATs can also be an important aspect in the evolution of wireless communications. In one aspect, LTE enhanced machine type communication (eMTC) or narrowband Internet of Things (NB-IoT) communication may coexist with similar NR communication. The coexistence can allow for a smooth migration path or transition for LTE eMTC/NB-IoT communication when reallocating or reframing the LTE spectrum to the NR spectrum. Resources may be partitioned between LTE eMTC/NB-IoT communication and NR communication, e.g., a semi-static resource partition via TDM or FDM. However, in some aspects, this semi-static resource partition may lead to inefficient resource utilization.

Figure 5B:
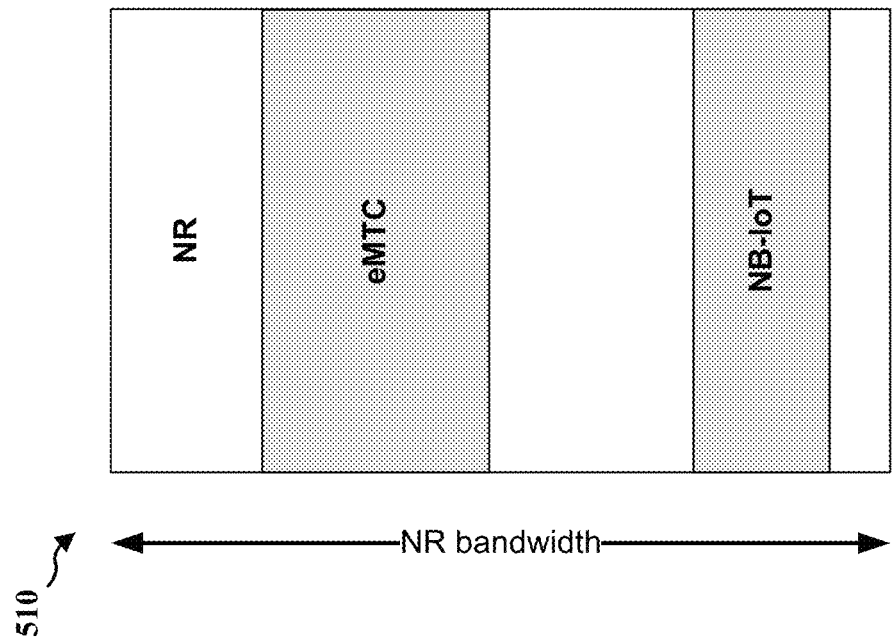
FIGS. 5A and 5B display an example of resource utilisation according to the present disclosure.
Figure 5A:
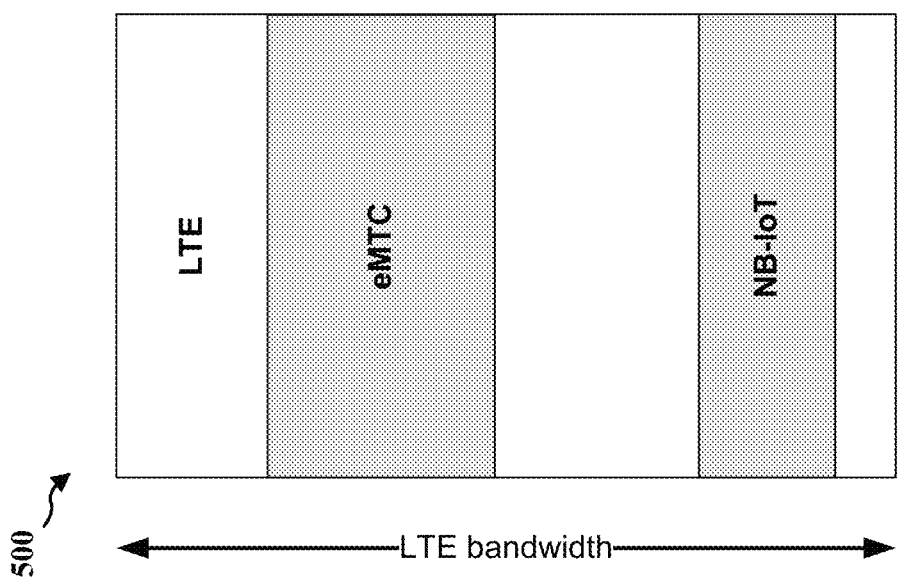

FIGS. 5A and 5B display an example of resource utilization 500 and 510, respectively, using a partition of resources. More specifically, FIG. 5A displays eMTC/NB-IoT communication based on LTE over a first bandwidth, while FIG. 5B displays eMTC/NB-IoT communication based on NR over a second bandwidth. Also, FIGS. 5A and 5B illustrate how eMTC and NB-IoT communication bandwidths may correspond to the overall bandwidths used for the LTE and NR communication, respectively. FIGS. 5A and 5B illustrate portions of the bandwidth, whether LTE or NR, that is partitioned and reserved for eMTC and NB-IoT. As mentioned above, coexistence of LTE eMTC/NB-IoT and NR communication can allow for a smooth migration path or transition for LTE eMTC/NB-IoT communication when reallocating or reframing the spectrum used for LTE to use for NR communication. However, the partitioning and reservation of resources illustrated in FIGS. 5A and 5B may lead to an inefficient use of resources. For instance, as the resources are reserved for specific types of communication, they may not be flexibly allocated for other types of communication, so these resources may be unused if they are not utilized by the specific types of communication.

As presented herein, dynamic resource multiplexing can be considered in order for NR communication to more efficiently utilize available resources. For example, in one aspect, dynamic resource multiplexing between eMTC/NB-IoT and NR communication can allow the NR communication to utilize any unused downlink and uplink resources reserved for eMTC or NB-IoT. In other aspects, NR communication can support a dynamic rate matching resource set in order to avoid NR communications colliding with other LTE signals or channels. In one aspect according to the present disclosure, one or more bits in DCI may include a rate matching resource set in one or more channels, e.g., a PDSCH. The rate matching resource set may be defined by one or more RB level bitmaps with 1 RB granularity and/or a symbol level bitmap spanning one or more slots. Thus, resources configured for eMTC or NB-IoT communication can be configured as rate matched resource sets when used by NR communication. As such, when eMTC or NB-IoT transmissions are present, the NR rate can be matched around the eMTC or NB-IoT transmission. Conversely, when eMTC and/or NB-IoT transmission are absent, the NR communication can use the entire bandwidth that is otherwise available to eMTC and/or NB-IoT communication. Accordingly, the present disclosure can rate match the resources for LTE, eMTC, NB-IoT, and/or NR communication.

Certain operations within NR communication may be flexible. In some aspects, TDD operation within NR communication can be specified in a flexible manner. Additionally, there can be multiple ways in which to configure uplink or downlink patterns. For example, NR TDD operation can be configured for uplink and/or downlink patterns through a semi-static configuration via higher layer signaling. In some aspects, the higher layer signaling can be SIB1 and/or RRC signaling. Further, NR TDD operation can be configured for uplink and/or downlink patterns through a dynamic configuration via a channel, e.g., a PDCCH. In some aspects, the PDCCH may be, for example, DCI format 2-0 and/or downlink or uplink grant.

For coexistence with NR communication, the eMTC and/or NB-IoT communication might only be scheduled in the resources with fixed downlink or uplink transmission in NR. In some instances, this may be because eMTC and/or NB-IoT communication cannot receive dynamic slot format configuration signaling from NR communication. In other aspects, the flexible resources can be dynamically reconfigured for uplink or downlink in LTE communication, as they may not be used for eMTC communication. In further aspects according to the present disclosure, NR communication may allow for mixed uplink or downlink transmissions within a single slot, subframe, or symbol. In addition, in some aspects of NR communication, a number of symbols at the end of a slot may be used for UCI transmissions. By doing so, in some aspects, this can enable fast feedback for URLLC, such as fast ACK/NAK feedback. In some aspects, these slots may not be used for scheduling eMTC or NB-IoT communications due to the collision of transmissions between eTMC, NB-IoT, and NR communication.

Figure 6:
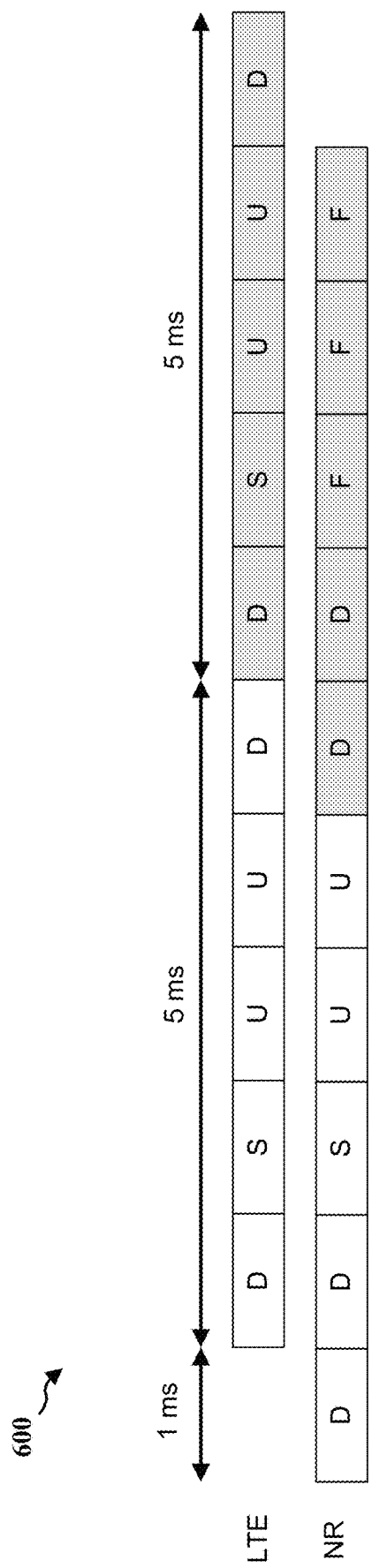
FIG. 6 displays an example of resource multiplexing according to the present disclosure.

FIG. 6 displays one example of resource multiplexing 600 according to aspects of the present disclosure. For instance, FIG. 6 illustrates the concept of scheduling eMTC or NB-IoT resources in flexible NR resources, e.g., slots. In one aspect, FIG. 6 displays that eMTC or NB-IoT slots may be utilized for uplink transmissions when flexible NR slots are indicated as uplink transmissions. FIG. 6 also shows that each slot can correspond to downlink, uplink, special, or flexible communication, which is indicated as 'D,' 'U,' 'S,' or 'F,' respectively.

FIG. 7 displays another example of resource multiplexing 700 according to aspects of the present disclosure. FIG. 7 illustrates that eMTC or NB-IoT downlink resources may be scheduled using NR resources for uplink/downlink communications. For example, FIG. 7 displays that eMTC or NB-IoT downlink subframes can be scheduled in NR slots using a mixed uplink/downlink transmissions. As illustrated in FIG. 7, LTE subframe '9' can correspond to downlink transmissions can be scheduled in NR slots '0' and '1.' Further, FIG. 7 also displays that LTE subframes '0' '1' '2' and '3' can be associated with NR slots '2-3,' '4-5,' '6-7,' and '8-9,' respectively. In some aspects, the TDD configuration for NR communication can assume a 30 kHz subcarrier spacing (SCS), wherein the downlink, uplink, or transmission periodicity is 5 ms. Also, FIG. 7 shows that light gray NR slots correspond to downlink communication, white NR slots correspond to a guard period (GP), and dark gray NR slots correspond to uplink communication.

As a solution to the challenges associated with coexistence of eMTC/NB-IoT and 5G NR communication, a base station can signal an uplink/downlink configuration for eMTC or NB-IoT corresponding to one or more resources. For instance, the base station can signal a first uplink/downlink configuration for eMTC or NB-IoT corresponding to full downlink slots or full uplink slots in NR. A full downlink slot is a slot for which all the symbols in the slot are configured for downlink communication without symbols configured for uplink communication. For example, this can be accomplished by reusing a previous, e.g., legacy, uplink/downlink subframe configuration signaling for eMTC or NB-IoT. Aspects of the present disclosure can also include signaling a second uplink/downlink configuration for eMTC or NB-IoT communication corresponding to flexible resources in NR. Thus, the first configuration may include an uplink/downlink configuration without flexible resources and the second configuration may include an uplink/downlink configuration based on flexible resources. In some instances, aspects that signal configurations for flexible resources may only be utilized with UEs that support these flexible resources, e.g., more recent eMTC or NB-IoT UEs. The first or second uplink/downlink configuration can indicate a set of valid resources, e.g., subframes, slots or symbols, for eMTC or NB-IoT uplink/downlink transmissions. In one aspect, the first or second uplink/downlink configuration can indicate a set of valid resources by using a bitmap. A valid resource may be a resource in which it is indicated as acceptable to transmit or receive information. An invalid resource may be a resource in which it is indicated as unacceptable to transmit or receive information. A partially valid resource may be a resource in which it is indicated as acceptable to transmit or receive information for at least a portion of the resource, while it is it indicated as unacceptable to transmit or receive information for at least another portion of the resource. For example, in one aspect, a partially valid resource may indicate that certain symbols are valid while other symbols are invalid.

In one example including a TDD uplink/downlink configuration for ten subframes corresponding to DSUUDD-SUUD, a first configuration can indicate that subframes '2' and '3' are valid for uplink transmissions and subframes '0,' '5,' and '9' are valid for downlink transmissions. In some aspects, the first configuration can be indicated as '1011010001.' Additionally, a second configuration can indicate that subframes '2,' '3,' '7,' and '8' are valid for uplink transmissions and subframes '0,' '5,' '4,' and '9' are valid for downlink transmissions, wherein subframes '4,' '7,' and '8' may be associated with flexible resources in NR. In some aspects, the first configuration can be indicated as '1011110111.' The aforementioned configurations can indicate, for example, a potential full or partial change of transmission direction.

In some aspects, the first and second uplink/downlink configurations may have different time domain granularities and/or periodicity. For example, in one aspect, the granularity of the first configuration may be 1 ms with a 10 ms or 40 ms periodicity as legacy configuration. Also, the granularity of the second configuration may be 0.5 ms, 0.25 ms or 0.125 ms, which can depend on the subcarrier spacing of the NR communication. In further aspects, the first configuration may correspond to a wideband and the second configuration may be specific to a narrowband or specific to a frequency range of PRB(s). In other aspects, the second configuration may overwrite the first configuration. That is, an invalid subframe of the first configuration may be configured as a valid subframe or partially valid on part of the symbols of the subframe by the second configuration. In other aspects, the first uplink/downlink configuration may be signaled as a legacy configuration using a first SIB (SIB1), and the second configuration may be configured using a second SIB, e.g., a cell specific SIB, or RRC signaling. All UEs supporting the dynamic resource sharing can utilize the aforementioned aspects of the disclosure.

In some aspects, if use of the second uplink/downlink configuration for downlink transmission is indicated in a SIB, then the second uplink/downlink configuration may be allowed for broadcasts outside SIB1 and for unicast transmissions. For example, additional repetitions can be scheduled in the subframes, slots, or symbols according to the second configuration. Alternatively, in other aspects, there may be separate uplink/downlink configurations or signaling for different search spaces or radio network temporary identifiers (RNTIs). Some aspects of the present disclosure can provide multiple types of RNTIs, such as broadcast RNTIs, paging RNTIs (P-RNTIs), system information RNTIs (SI-RNTIs), random access RNTIs (RA-RNTIs), temporary cell RNTIs (C-RNTIs), GSM/EDGE radio access network RNTIs (G-RNTIs), and/or semi-persistent scheduling (SPS) C-RNTIs. In one aspect, a first type of RNTI may be based on the first uplink/downlink configuration and a second type of RNTI may be based on the second uplink/downlink configuration.

The present disclosure can also use separate configurations based on the channel for communication, e.g., PDCCH, PDSCH, or PUSCH. For example, some aspects can utilize the first configuration for PDCCH and the second configuration for PDSCH or PUSCH. In other aspects, when using eMTC, the present disclosure may utilize separate configurations based on the configured coverage enhancement (CE) mode for PDSCH or PUSCH. For example, some aspects can use the second configuration for CE mode A, e.g., for which high data throughput may be required, and use the first configuration for CE mode B. In other aspects, subframes corresponding to the second configuration may be dynamically changed. Additionally, UEs according to the present disclosure may be used to detect the change of data transmission.

In other aspects of the present disclosure, the PDSCH or PUSCH may be configured with two or more sets of uplink/downlink configurations. In addition, a PDSCH or PUSCH may indicate which set of uplink/downlink configuration is to be used for a particular transmission, e.g., via one or more bits in a PDCCH. For example, one bit in DCI of a PDCCH may be used to indicate whether to use the first or second configuration for the scheduled PDSCH or PUSCH transmission. Further, the uplink/downlink configuration of a PDSCH or PUSCH may also be dynamically changed during the transmission due to dynamic reconfiguration of the slot format of flexible resources in NR. In one aspect, if the second configuration is indicated for a PDSCH or PUSCH by DCI then the UE may be required to fallback to the first configuration after a number of transmissions, for example, at the next reconfiguration period which can also be signaled via SIB or RCC. In another aspect, the fallback can be based on detecting a PDCCH to indicate the fallback to the first configuration.

Figure 8:
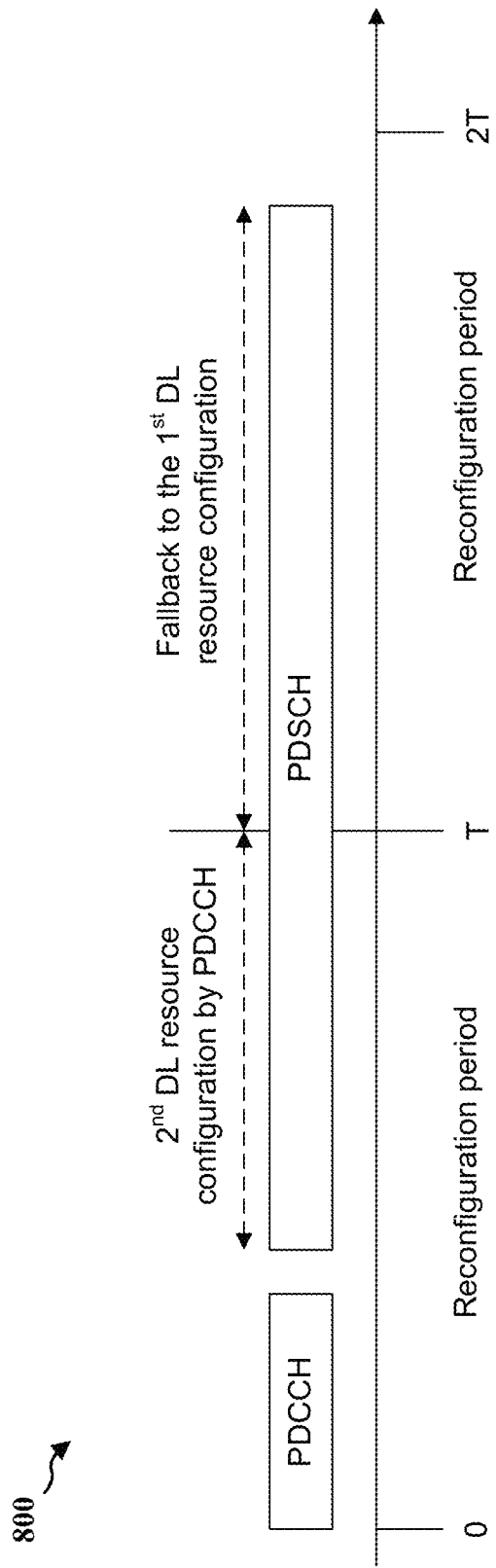
FIG. 8 displays another example of resource multiplexing according to the present disclosure.

FIG. 8 displays another example of resource multiplexing 800 according to aspects of the present disclosure. More specifically, FIG. 8 displays one aspect of a fallback procedure. For example, FIG. 8 illustrates a fallback to the first configuration, from the second configuration, at the beginning of a new reconfiguration period. For instance, the second reconfiguration is indicated by a PDCCH and at the end of the reconfiguration period, there is a fallback to the first configuration indicated by the PDSCH. In some aspects, the reconfiguration period may be similar to a timer. As such, a UE according to the present disclosure can fallback to the first configuration at the end of the configuration period, which corresponds to the fixed uplink/downlink slots in NR.

Figure 9:
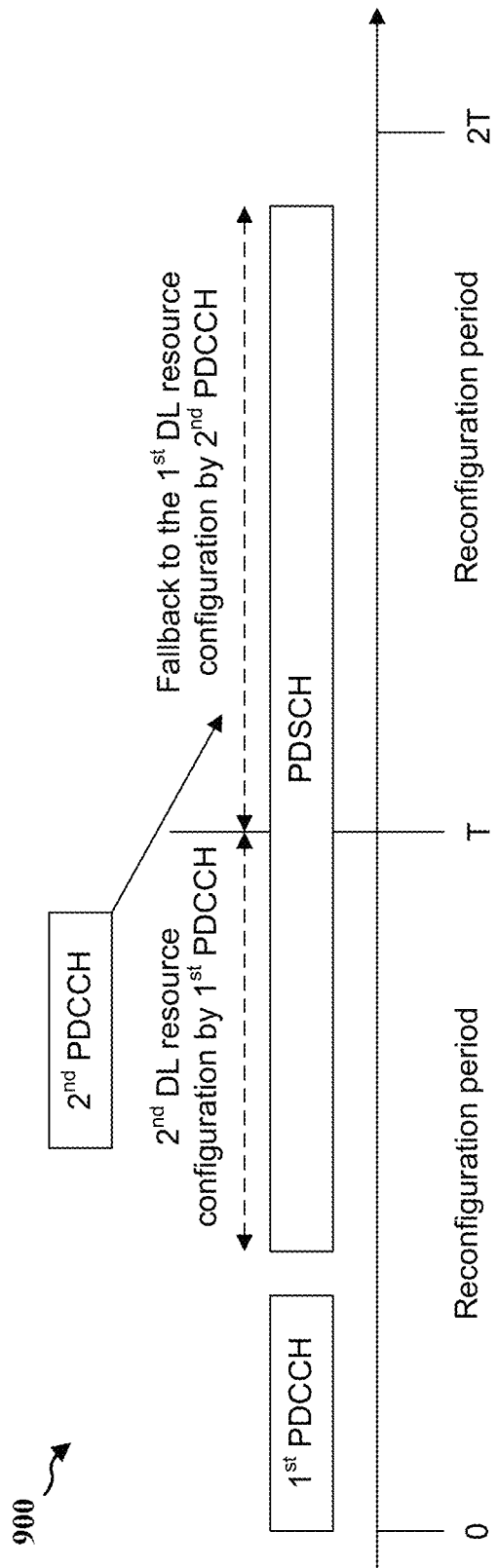
FIG. 9 displays another example of resource multiplexing according to the present disclosure.

FIG. 9 displays another example of resource multiplexing 900 according to aspects of the present disclosure. FIG. 9 shows one aspect of a fallback procedure. For example, FIG. 9 illustrates a fallback to the first configuration based on a detected PDCCH. More specifically, FIG. 9 displays a fallback to the first configuration or another configuration as indicated in a second PDCCH. In this aspect, the fallback procedure takes place at the end of a reconfiguration period. Additionally, if a PDCCH instructs UE to fallback to another configuration, then the UE will fallback during the next reconfiguration period.

In some aspects, the fallback options for PDSCH or PUSCH may be configured for the UE by a higher layer and/or dependent on the coverage CE for eMTC. In other aspects, the present disclosure may use the first configuration for CE mode B and the second configuration for CE mode A. In these aspects, this can be because the maximum number of repetitions for a PDCCH transmission in CE mode A may be relatively smaller which enables fast fallback. Additionally, if a UE can detect a PDCCH quickly, it can enable a quick fallback.

Figure 10:
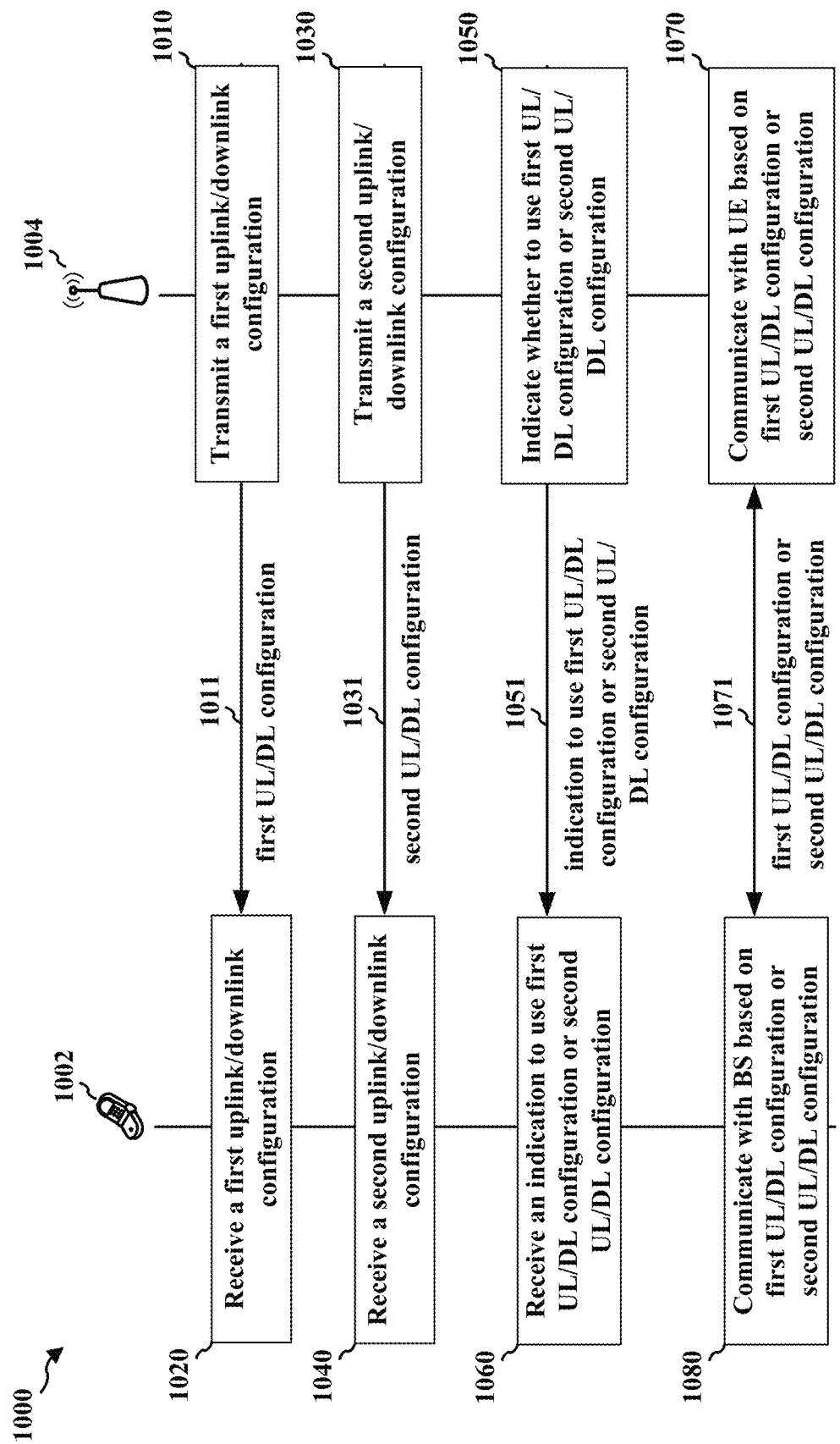
FIG. 10 is a diagram illustrating transmissions between a base station and a UE.

FIG. 10 is a diagram 1000 illustrating transmissions between base station 1004 and UE 1002. For instance, base station 1004 can transmit 1010 a first uplink/downlink configuration 1011 for communicating with UE 1002. UE 1002 can likewise receive 1020 first uplink/downlink configuration 1011 for communicating with base station 1004. The first uplink/downlink configuration can comprise a set of fixed resources configured for uplink communication without downlink resources for downlink communication or for downlink communication without uplink resources for uplink communication. Base station can also transmit 1030 a second uplink/downlink configuration 1031 for communicating with UE 1002. The second configuration can comprise a flexible resource configuration, as described in connection with the examples in FIGS. 6 and 7. UE 1002 can likewise receive 1040 second uplink/downlink configuration 1031 for communicating with base station 1004.

In other aspects, the first uplink/downlink configuration can indicate valid resources for uplink or downlink eMTC or NB-IoT communication, as described in connection with the examples in FIGS. 6 and 7. Also, the second uplink/downlink configuration can indicate valid resources for uplink or downlink eMTC or NB-IoT communication, as described in connection with the examples in FIGS. 6 and 7. In some aspects, the valid resources can be indicated using a bitmap. In addition, the first uplink/downlink configuration and the second uplink/downlink configuration can comprise different time domain granularities or different periodicities. In further aspects, the first uplink/downlink configuration can correspond to a wideband and the second uplink/downlink configuration correspond to a narrowband or a frequency range of a PRB.

In other aspects, a subframe configured as an invalid subframe in the first uplink/downlink configuration may be configured as at least partially valid in the second uplink/downlink configuration. Also, the first configuration can be signaled using a first SIB and the second configuration can be signaled using a second, cell specific SIB or RRC signaling. In further aspects, if use of the second uplink/downlink configuration is indicated in system information, the second uplink/downlink configuration may be valid for broadcast and unicast communication. Also, the first uplink/downlink configuration can apply for a first type of RNTI and the second uplink/downlink configuration can apply for a second type of RNTI. The first configuration can also indicate resources for a downlink control channel and the second configuration can indicate resources for a data channel. Further, the first configuration and the second configuration can correspond to different CE modes.

In yet other aspects, base station 1004 can indicate 1050 whether to use the first uplink/downlink configuration or the second uplink/downlink configuration for communication with UE 1002. Likewise, UE 1002 can receive 1060 an indication 1051 to use the first uplink/downlink configuration or the second uplink/downlink configuration. In some aspects, the indication 1051 whether to use the first uplink/downlink configuration or the second uplink/downlink configuration can occur in a downlink control channel. Base station 1004 can then communicate 1070 with UE 1002 based on the first uplink/downlink configuration or the second uplink/downlink configuration 1071. UE 1002 can also communicate 1080 with base station 1004 based on the first uplink/downlink configuration or the second uplink/downlink configuration 1071.

Also, one or more bits of DCI may indicate whether to use the first uplink/downlink configuration or the second uplink/downlink configuration. In further aspects, when the downlink control channel indicates to use the second uplink/downlink configuration for the data channel, base station 1004 can dynamically reconfigure one or more flexible resources, as described in connection with the examples in FIGS. 8 and 9. In these aspects, the one or more UEs can employ the first uplink/downlink configuration in connection with the reconfiguring the one or more flexible resources. In other aspects, UE 1002 can switch to the other of the first uplink/downlink configuration or the second uplink/downlink configuration at a beginning of a reconfiguration period, as described in connection with the examples in FIGS. 8 and 9. Base station 1004 can also transmit a fallback indication to identify the first uplink/downlink configuration or the second uplink/downlink configuration. Additionally, base station 1004 can configure fallback parameters for UE 1002 to fallback from using the second uplink/downlink configuration to using the first uplink/downlink configuration.

Figure 11:
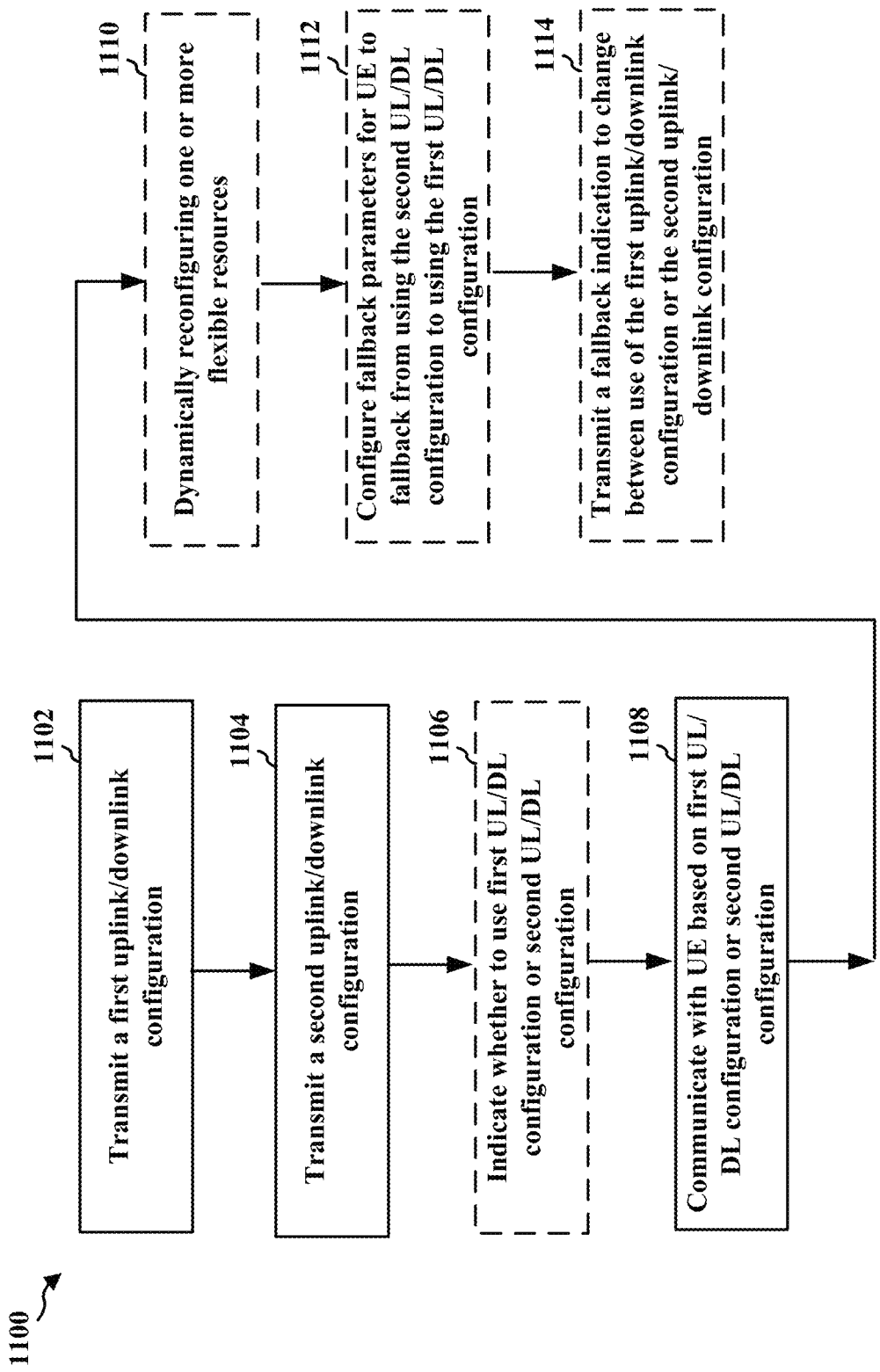
FIG. 11 is a flowchart of a method of wireless communication.

FIG. 11 is a flowchart 1100 of a method of wireless communication. The method may be performed by a base station or a component of a base station (e.g., base station 102, 180, 310, 402, 1004, apparatus 1202; processing system 1314, which may include the memory 376 and which may be the entire base station or a component of the base station, such as the TX processor 316, the RX processor 370, and/or the controller/processor 375) communicating with a UE (e.g., UE 104, 350, 404, 1002, apparatus 1502). Optional aspects are illustrated with a dashed line. The methods described herein can provide a number of benefits, such as improving communication signaling, resource utilisation, and/or power savings.

At 1102, the base station can transmit a first uplink/downlink configuration for communicating with one or more UEs. For example, transmission component 1218 of apparatus 1202 may transmit a first uplink/downlink configuration for communicating with one or more UEs. The first uplink/downlink configuration can comprise a set of fixed resources configured for uplink communication without downlink resources for downlink communication or for downlink communication without uplink resources for uplink communication.

At 1104, the base station can also transmit a second uplink/downlink configuration for communicating with one or more UEs. For example, transmission component 1218 of apparatus 1202 may transmit a second uplink/downlink configuration for communicating with one or more UEs. The second configuration can comprise a flexible resource configuration, as described in connection with the examples in FIGS. 6 and 7.

The first uplink/downlink configuration and/or the second uplink/downlink configuration can indicate valid resources for uplink or downlink eMTC or NB-IoT communication, as described in connection with the examples in FIGS. 6 and 7. In some aspects, the valid resources can be indicated using a bitmap. In addition, the first uplink/downlink configuration and the second uplink/downlink configuration can comprise different time domain granularities and/or different periodicities. In further aspects, the first uplink/downlink configuration can correspond to a wideband and the second uplink/downlink configuration correspond to a narrowband or a frequency range of a PRB.

A subframe configured as an invalid subframe in the first uplink/downlink configuration may be configured as at least partially valid in the second uplink/downlink configuration. A valid resource may be a resource in which it is indicated as acceptable to transmit or receive information. An invalid resource may be a resource in which it is indicated as unacceptable to transmit or receive information. A partially valid resource may be a resource in which it is indicated as acceptable to transmit or receive information for at least a portion of the resource, while it is it indicated as unacceptable to transmit or receive information for at least another portion of the resource. For example, in one aspect, a partially valid resource may indicate that certain symbols are valid while other symbols are invalid.

The first configuration can be also signaled using a first SIB and the second configuration can be signaled using a second, cell specific SIB or RRC signaling. In further aspects, if use of the second uplink/downlink configuration is indicated in system information, the second uplink/downlink configuration may be valid for broadcast and unicast communication. Also, the first uplink/downlink configuration can apply for a first type of RNTI and the second uplink/downlink configuration can apply for a second type of RNTI. The first configuration can also indicate resources for a downlink control channel and the second configuration can indicate resources for a data channel. Further, the first configuration and the second configuration can correspond to different CE modes.

At 1106, the base station may indicate whether to use the first uplink/downlink configuration or the second uplink/downlink configuration for communication with one or more UEs. For example, UL/DL indication component 1208 of apparatus 1202 may indicate whether to use the first uplink/downlink configuration or the second uplink/downlink configuration for communication with one or more UEs. In some aspects, the indication whether to use the first uplink/ downlink configuration or the second uplink/downlink configuration can occur in a downlink control channel.

At 1108, the base station may then communicate with the one or more UEs based on the first uplink/downlink configuration or the second uplink/downlink configuration. For example, communication component 1210 of apparatus 1202 may communicate with the one or more UEs based on the first uplink/downlink configuration or the second uplink/downlink configuration. Additionally, one or more bits of DCI may indicate whether to use the first uplink/downlink configuration or the second uplink/downlink configuration.

At 1110, when the downlink control channel indicates to use the second uplink/downlink configuration for the data channel, the base station may dynamically reconfigure one or more flexible resources, as described in connection with the examples in FIGS. 8 and 9. For example, reconfiguration component 1212 of apparatus 1202 may dynamically reconfigure one or more flexible resources. The one or more UEs can employ the first uplink/downlink configuration in connection with the reconfiguring the one or more flexible resources.

At 1112, the base station may configure fallback parameters for the one or more UFs to fallback from using the second uplink/downlink configuration to using the first uplink/downlink configuration. For example, fallback configuration component 1214 of apparatus 1202 may configure fallback parameters for the one or more UEs to fallback from using the second uplink/downlink configuration to using the first uplink/downlink configuration. In other aspects, the UEs can switch to the other of the first uplink/downlink configuration or the second uplink/downlink configuration at a beginning of a reconfiguration period, as described in connection with the examples in FIGS. 8 and 9.

At 1114, the base station may also transmit a fallback indication to identify the first uplink/downlink configuration or the second uplink/downlink configuration. For example, fallback indication component 1216 of apparatus 1202 may transmit, e.g., via transmission component 1218, a fallback indication to identify the first uplink/downlink configuration or the second uplink/downlink configuration.

Figure 12:
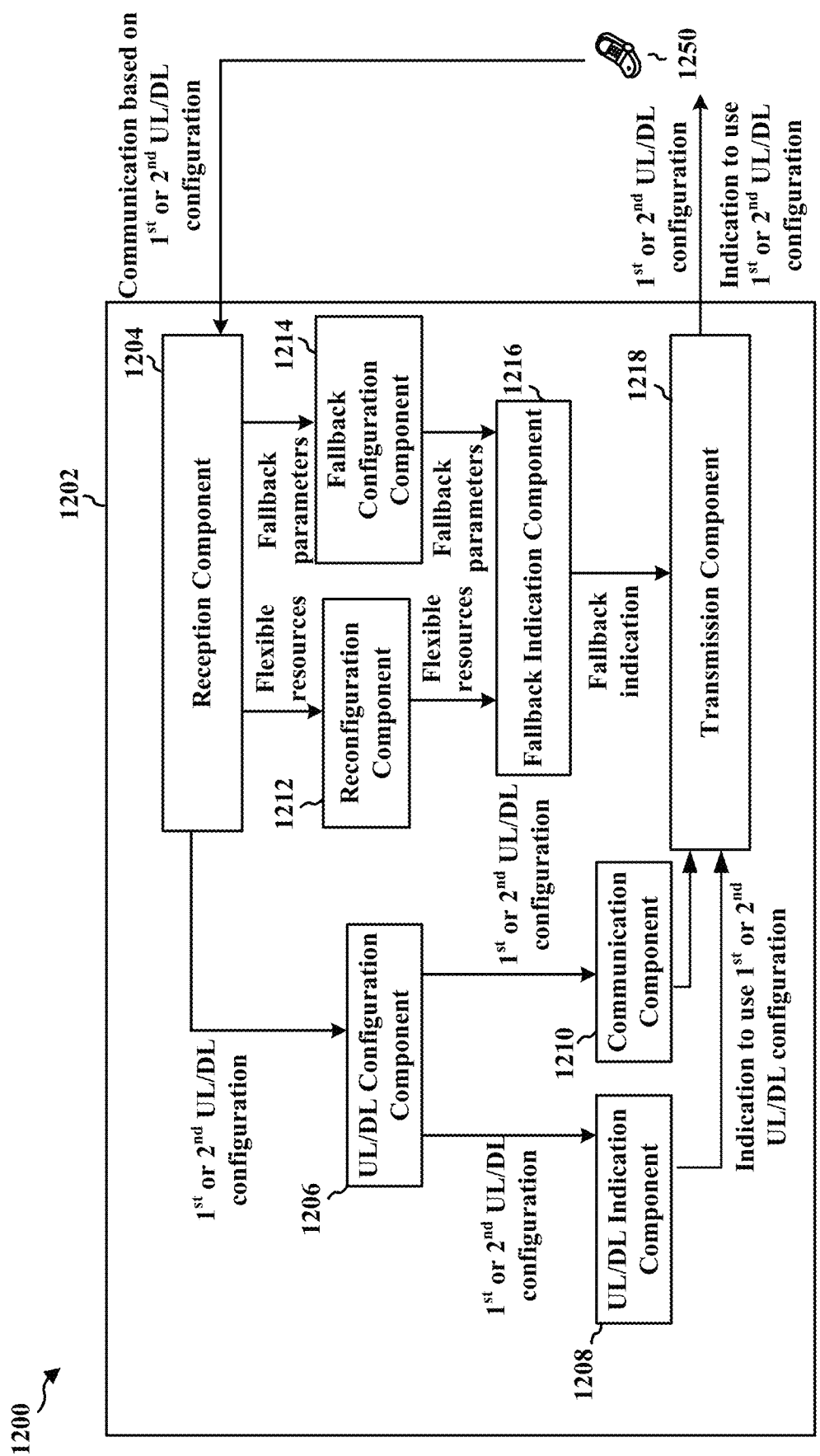
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a base station or a component of a base station. The apparatus includes an UL/DL configuration component 1206 that is configured to transmit, e.g., via transmission component 1218, a first uplink/downlink configuration and a second uplink/downlink configuration, e.g., as described in connection with steps 1102 and 1104 above. The apparatus also includes an UL/DL indication component 1208 that is configured to indicate, e.g., via transmission component 1218, whether to use the first uplink/downlink configuration or the second uplink/downlink configuration, e.g., as described in connection with step 1106 above. Also, the apparatus includes a communication component 1210 that is configured to communicate, e.g., via reception component 1204 and transmission component 1218, with a UE 1250 based on the first uplink/downlink configuration or the second uplink/downlink configuration, e.g., as described in connection with step 1108 above. The apparatus also includes a reconfiguration component 1212 that is configured to dynamically reconfigure one or more flexible resources, e.g., as described in connection with step 1110 above. Additionally, the apparatus includes a fallback configuration component 1214 that is configured to configure fallback parameters for a UE to fallback from using the second uplink/downlink configuration to using the first uplink/downlink configuration, e.g., as described in connection with step 1112 above. Further, the apparatus includes a fallback indication component that is configured to transmit, e.g., via transmission component 1218, a fallback indication to identify the first uplink/downlink configuration or the second uplink/downlink configuration, e.g., as described in connection with step 1114 above.

The apparatus may include additional components that perform each of the blocks of the algorithm in the aforementioned flowcharts of FIGS. 10 and 11. As such, each block in the aforementioned flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
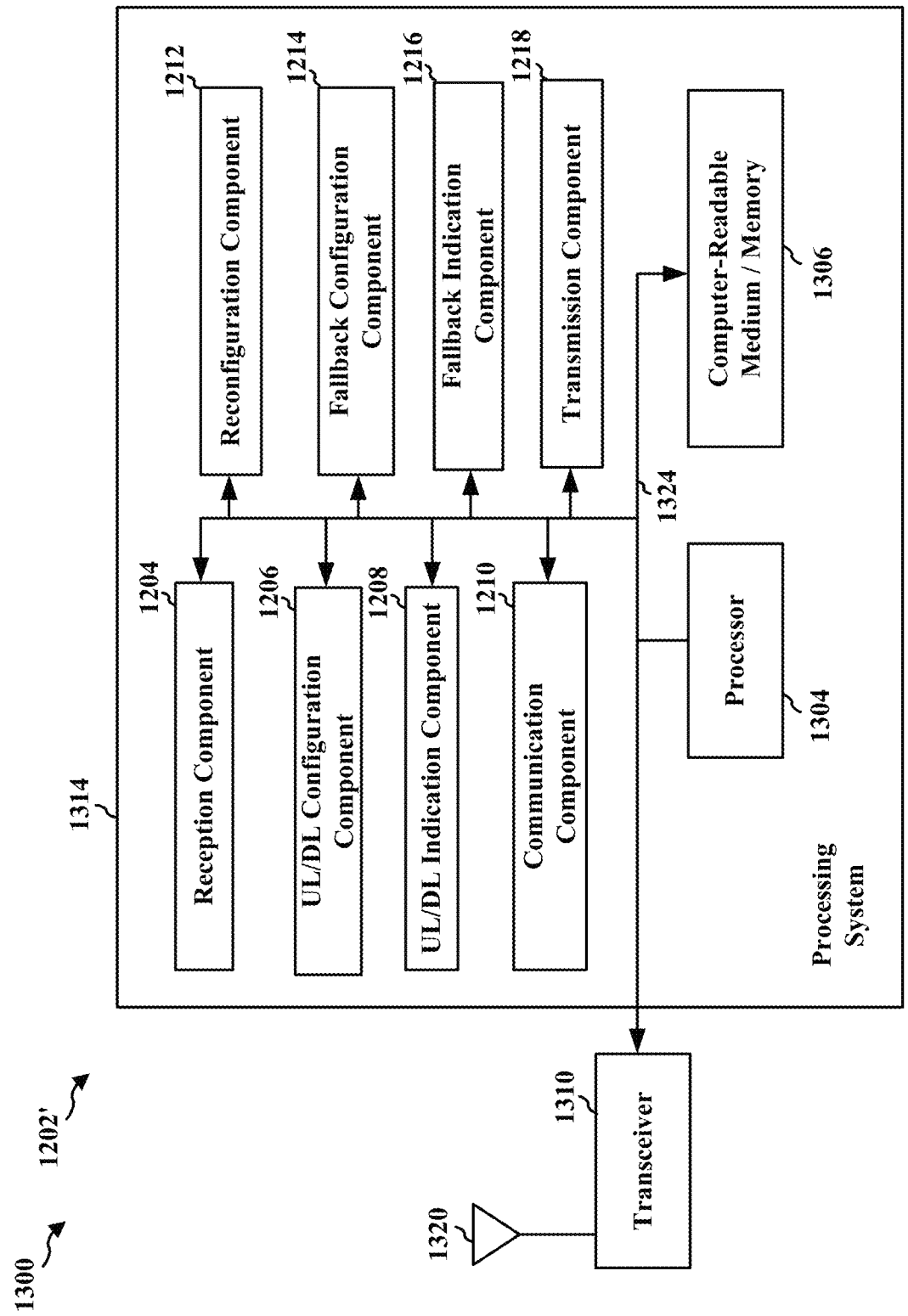
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, 1216, 1218, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1218, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214, 1216, 1218. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375.

In one configuration, the apparatus 1202/1202' for wireless communication includes means for transmitting a first uplink/downlink configuration for communicating with one or more UEs. The apparatus can also include means for transmitting a second uplink/downlink configuration for communicating with the one or more UEs. Also, the apparatus can include means for communicating with a least one of the one or more UEs based on the first uplink/downlink configuration or the second uplink/downlink configuration. The apparatus can further include means for indicating, in a downlink control channel, whether to use the first configuration or the second configuration for data channel communication with the one or more UEs. Additionally, the apparatus can include means for dynamically reconfiguring one or more flexible resources. The apparatus can also include means for transmitting a fallback indication identifying the first uplink/downlink configuration or the second uplink/downlink configuration. Further, the apparatus can include means for configuring fallback parameters for the one or more UEs to fallback from using the second uplink/downlink configuration to using the first uplink/downlink configuration. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 14:
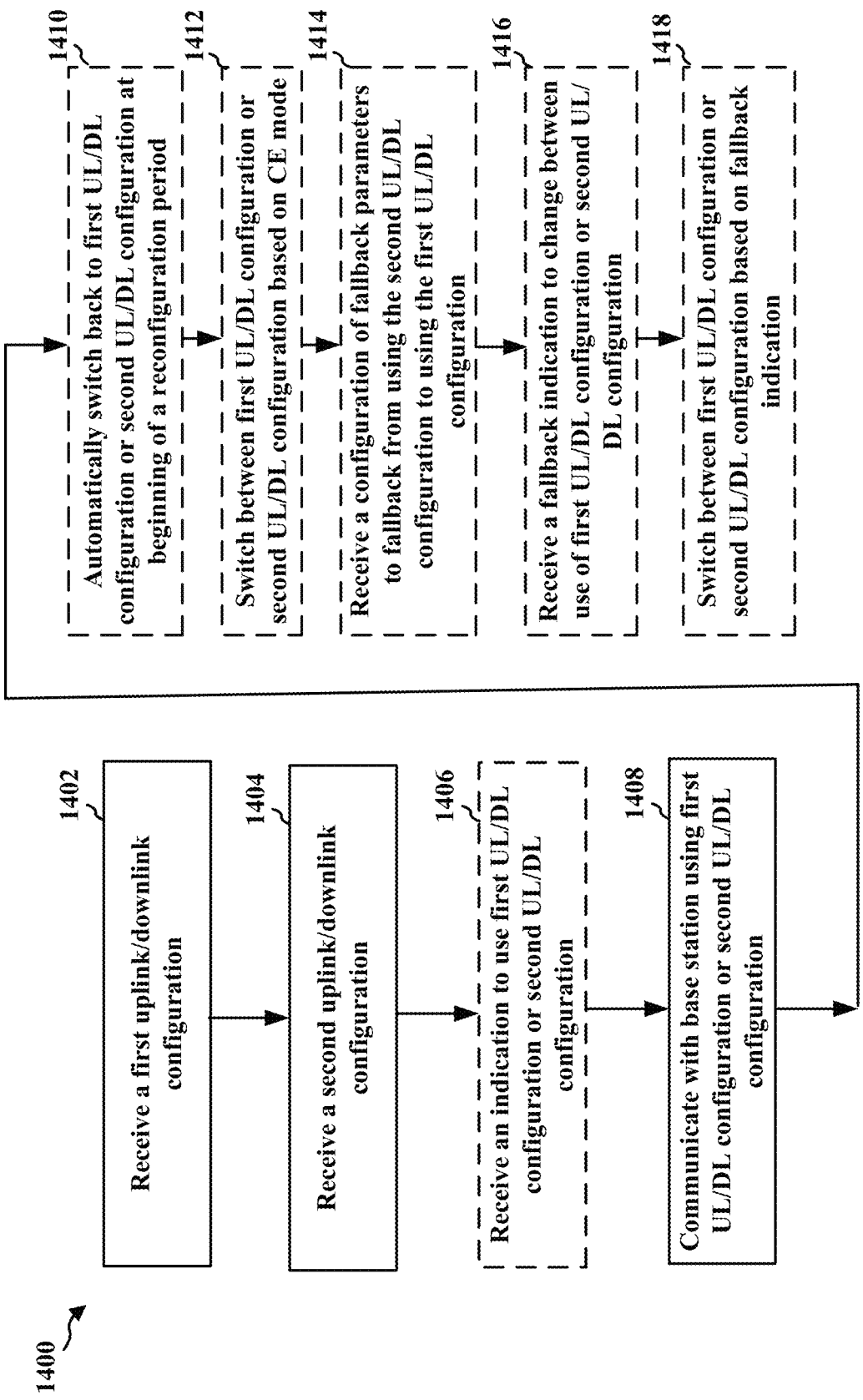
FIG. 14 is a flowchart of a method of wireless communication.

FIG. 14 is a flowchart 1400 of a method of wireless communication. The method may be performed by a UE or a component of a UE (e.g., UE 104, 350, 404, 1002, apparatus 1502; processing system 1614, which may include the memory 360 and which may be the entire UE or a component of the UE, such as the TX processor 368, the RX processor 356, and/or the controller/processor 359) communicating with a base station (e.g., base station 102, 180, 310, 402, 1004, apparatus 1202). Optional aspects are illustrated with a dashed line. The methods described herein can provide a number of benefits, such as improving communication signaling, resource utilisation, and/or power savings.

At 1402, the UE can receive first uplink/downlink configuration for communicating with a base station. For example, UL/DL configuration component 1506 of apparatus 1502 may receive, e.g., via reception component 1504, first uplink/downlink configuration for communicating with a base station. The first uplink/downlink configuration can be for a set of fixed resources configured for uplink communication without downlink resources for downlink communication or for downlink communication without uplink resources for uplink communication.

At 1404, the UE can receive a second uplink/downlink configuration for communicating with the base station. For example, UL/DL configuration component 1506 of apparatus 1502 may receive, e.g., via reception component 1504, a second uplink/downlink configuration for communicating with the base station. The second configuration can comprise one or more flexible resources, as described in connection with the examples in FIGS. 6 and 7.

The first uplink/downlink configuration or the second uplink/downlink configuration can indicate valid resources for uplink or downlink eMTC or NB-IoT communication, as described in connection with the examples in FIGS. 6 and 7. The valid resources can be indicated using a bitmap. In addition, the first uplink/downlink configuration and the second uplink/downlink configuration can comprise different time domain granularities or different periodicities. In further aspects, the first uplink/downlink configuration can correspond to a wideband and the second uplink/downlink configuration correspond to a narrowband or a frequency range of a PRB.

A subframe configured as an invalid subframe in the first uplink/downlink configuration may be configured as at least partially valid in the second uplink/downlink configuration. A valid resource may be a resource in which it is indicated as acceptable to transmit or receive information. An invalid resource may be a resource in which it is indicated as unacceptable to transmit or receive information. A partially valid resource may be a resource in which it is indicated as acceptable to transmit or receive information for at least a portion of the resource, while it is it indicated as unacceptable to transmit or receive information for at least another portion of the resource. For example, in one aspect, a partially valid resource may indicate that certain symbols are valid while other symbols are invalid.

Also, the first configuration can be signaled using a first SIB and the second configuration can be signaled using a second, cell specific SIB or RRC signaling. If use of the second uplink/downlink configuration is indicated in system information, the second uplink/downlink configuration may be valid for broadcast and unicast communication. Also, the first uplink/downlink configuration can apply for a first type of RNTI and the second uplink/downlink configuration can apply for a second type of RNTI. The first configuration can also indicate resources for a downlink control channel and the second configuration can indicate resources for a data channel. Further, the first configuration and the second configuration can correspond to different CE modes.

At 1406, the UE may receive an indication to use the first uplink/downlink configuration or the second uplink/downlink configuration. For example, UL/DL indication component 1508 of apparatus 1502 may receive, e.g., via reception component 1504, an indication to use the first uplink/downlink configuration or the second uplink/downlink configuration. The indication of whether to use the first uplink/downlink configuration or the second uplink/downlink configuration can occur in a downlink control channel.

At 1408, the UE may then communicate with the base station based on the first uplink/downlink configuration or the second uplink/downlink configuration. For example, communication component 1510 of apparatus 1502 may communicate, e.g., via transmission component 1518, with the base station based on the first uplink/downlink configuration or the second uplink/downlink configuration.

Also, one or more bits of DCI may indicate whether to use the first uplink/downlink configuration or the second uplink/downlink configuration. In further aspects, when the downlink control channel indicates to use the second uplink/downlink configuration for the data channel, one or more flexible resources can be dynamically reconfigured, as described in connection with the examples in FIGS. 8 and 9. In these aspects, the one or more UEs can employ the first uplink/downlink configuration in connection with the reconfiguring the one or more flexible resources.

At 1410, the UE may switch to the other of the first uplink/downlink configuration or the second uplink/downlink configuration at a beginning of a reconfiguration period, as described in connection with the examples in FIGS. 8 and 9. For example, switching component 1516 of apparatus 1502 may switch to the other of the first uplink/downlink configuration or the second uplink/downlink configuration at a beginning of a reconfiguration period.

At 1412, the UE may switch between use of the first uplink/downlink configuration or the second uplink/downlink configuration based on a CE mode. For example, switching component 1516 of apparatus 1502 may switch between use of the first uplink/downlink configuration or the second uplink/downlink configuration based on a CE mode.

Additionally, at 1414, the UE may receive a configuration of fallback parameters for fallback from using the second uplink/downlink configuration to using the first uplink/downlink configuration. For example, fallback configuration component 1512 of apparatus 1502 may receive, e.g., via reception component 1504, a configuration of fallback parameters for fallback from using the second uplink/downlink configuration to using the first uplink/downlink configuration.

At 1416, the UE may receive a fallback indication to identify the first uplink/downlink configuration or the second uplink/downlink configuration. For example, fallback indication component 1514 of apparatus 1502 may receive, e.g., via reception component 1504, a fallback indication to identify the first uplink/downlink configuration or the second uplink/downlink configuration.

Finally, at 1418, the UE may switch between the first uplink/downlink configuration or the second uplink/downlink configuration based on the fallback indication. For example, switching component 1516 of apparatus 1502 may between the first uplink/downlink configuration or the second uplink/downlink configuration based on the fallback indication.

Figure 15:
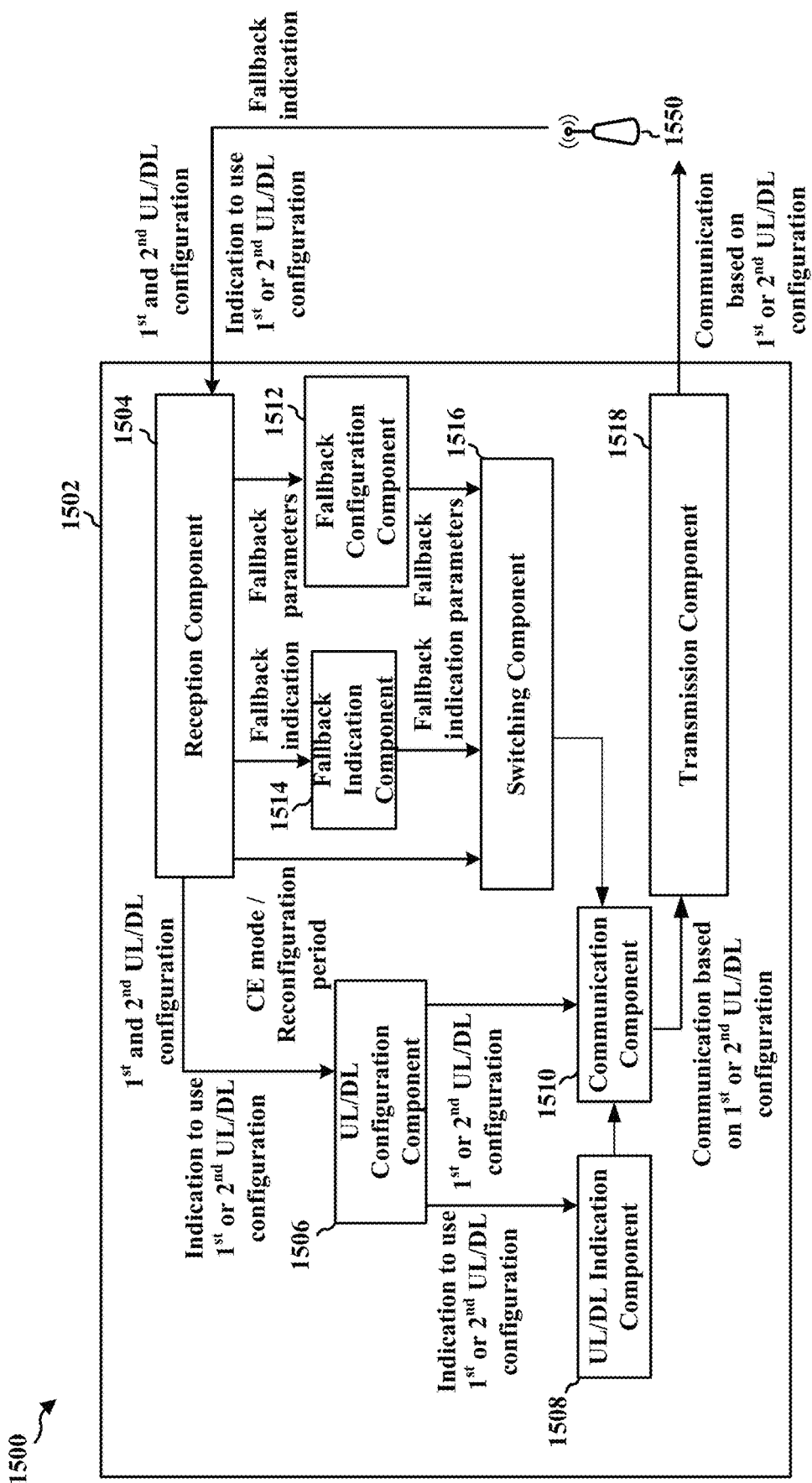
FIG. 15 is a conceptual data flow diagram illustrating the data flow between different means/components in an exemplary apparatus.

FIG. 15 is a conceptual data flow diagram 1500 illustrating the data flow between different means/components in an exemplary apparatus 1502. The apparatus may be a UE or a component of a UE. The apparatus includes a UL/DL configuration component 1506 that is configured to receive, e.g., via reception component 1504, a first uplink/downlink configuration and a second uplink/downlink configuration, e.g., as described in connection with steps 1402 and 1404 above. The apparatus also includes a UL/DL indication component 1508 that is configured to receive, e.g., via reception component 1504, an indication to use the first uplink/downlink configuration or the second uplink/downlink configuration, e.g., as described in connection with step 1406 above. The apparatus further includes a communication component 1510 that is configured to communicate, e.g., via reception component 1504 and transmission component 1518, with a base station, e.g., base station 1550, using the first uplink/downlink configuration or the second uplink/downlink configuration, e.g., as described in connection with step 1408 above. Also, the apparatus includes a fallback configuration component 1512 that is configured to receive, e.g., via reception component 1504, a configuration of fallback parameters to fallback from using the second uplink/downlink configuration to using the first uplink/downlink configuration, e.g., as described in connection with step 1414 above. The apparatus also includes a fallback indication component 1514 that is configured to receive, e.g., via reception component 1504, a fallback indication to identify the first uplink/downlink configuration or the second uplink/downlink configuration, e.g., as described in connection with step 1416 above. Additionally, the apparatus includes a switching component 1516 that is configured to switch to the first uplink/downlink configuration or the second uplink/downlink configuration at beginning of a reconfiguration period, e.g., as described in connection with step 1410 above. Switching component 1516 is also configured to switch between the first uplink/downlink configuration or the second uplink/downlink configuration based on a CE mode, e.g., as described in connection with step 1412 above. Further, switching component 1516 is also configured to switch between the first uplink/downlink configuration or the second uplink/downlink configuration based on the fallback indication, e.g., as described in connection with step 1418 above.

The apparatus may include additional components that perform each of the blocks of the algorithm in the aforementioned flowcharts of FIGS. 10 and 14. As such, each block in the aforementioned flowcharts of FIGS. 10 and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
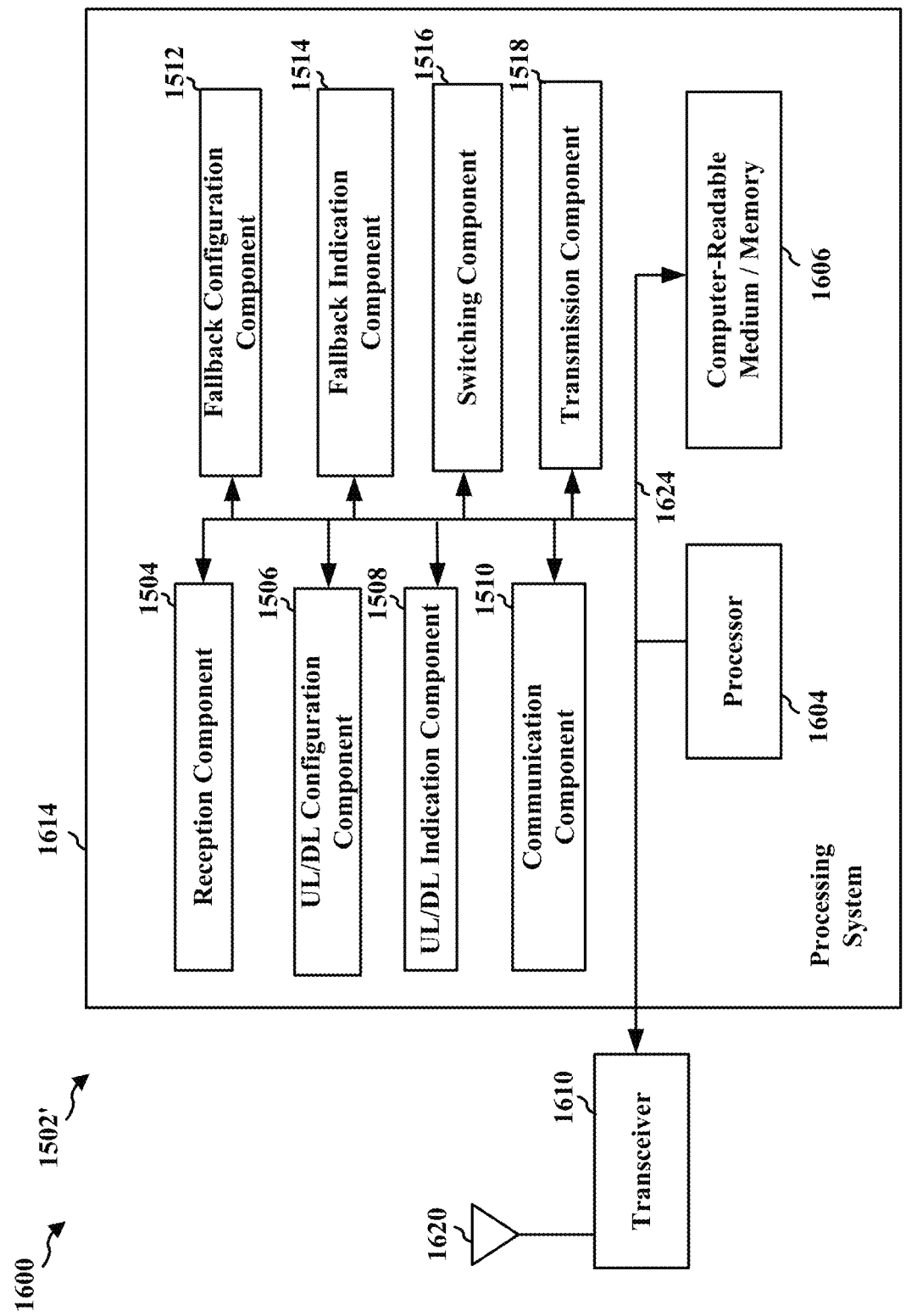
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1508, 1510, 1512, 1514, 1516, 1518, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1518, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506, 1508, 1510, 1512, 1514, 1516, 1518. The components may be software components running in the processor 1604, resident/stored in the computer readable medium/memory 1606, one or more hardware components coupled to the processor 1604, or some combination thereof. The processing system 1614 may be a component of the UE 350 and may include the memory 360 and/or at least one of the TX processor 368, the RX processor 356, and the controller/processor 359.

In one configuration, the apparatus 1502/1502' for wireless communication includes means for receiving, from a base station, a first uplink/downlink configuration for a set of fixed resources configured for uplink communication without downlink resources for downlink communication or for downlink communication without uplink resource for uplink communication. The apparatus can include means for receiving, from the base station, a second uplink/downlink configuration comprising one or more flexible resources. The apparatus can also include means for communicating with the base station using the first the first uplink/downlink configuration or the second uplink/downlink configuration. Moreover, the apparatus can include means for receiving an indication, in a downlink control channel, of whether to use the first configuration or the second configuration for data communication with the base station. The apparatus can further include means for switching to the other of the first uplink/downlink configuration or the second uplink/downlink configuration at a beginning of a reconfiguration period. The apparatus can also include means for receiving a fallback indication identifying the first uplink/downlink configuration or the second uplink/downlink configuration. Additionally, the apparatus can include means for switching between the first uplink/downlink configuration or the second uplink/downlink configuration based on the fallback indication. The apparatus can also include means for receiving a configuration of fallback parameters for fallback from using the second uplink/downlink configuration to using the first uplink/downlink configuration. Further, the apparatus can include means for switching between use of the first uplink/downlink configuration or the second uplink/downlink configuration based on a CE mode. The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
   transmitting a first uplink/downlink configuration for communicating with one or more User Equipments (UEs), wherein the first uplink/downlink configuration comprises a set of fixed resources configured for uplink communication without downlink resources for downlink communication or for downlink communication without uplink resources for uplink communication, wherein the set of fixed resources are configured for new radio (NR);
   transmitting a second uplink/downlink configuration for communicating with the one or more UEs, wherein the second uplink/downlink configuration comprises a flexible resource configuration configured for the uplink communication and the downlink communication, and wherein the first uplink/downlink configuration or the second uplink/downlink configuration indicates at least one valid resource for enhanced machine type communication (eMTC) communication or narrowband internet of things (NB-IoT) communication, wherein the flexible resource configuration is configured for the NR, wherein the first uplink/downlink configuration and the second uplink/downlink configuration comprise different time domain granularities or different periodicities; and
   communicating the eMTC communication or the NB-IoT communication with at least one of the one or more UEs based on the at least one valid resource indicated in the first uplink/downlink configuration or the second uplink/downlink configuration.

2. The method of claim 1, wherein the at least one valid resource is indicated using a bitmap.

3. The method of claim 1, wherein the narrowband corresponds to a frequency range of a physical resource block (PRB).

4. The method of claim 1, wherein a subframe configured as an invalid subframe in the first uplink/downlink configuration is configurable as being at least partially valid in the second uplink/downlink configuration.

5. The method of claim 1, wherein the first uplink/downlink configuration is signaled using a first system information block (SIB) and the second uplink/downlink configuration is signaled using a second, cell specific SIB or radio resource control (RRC) signaling.

6. The method of claim 1, wherein if use of the second uplink/downlink configuration is indicated in system information, the second uplink/downlink configuration is valid for broadcast and unicast communication.

7. The method of claim 1, wherein the first uplink/downlink configuration applies for a first type of Radio Network Temporary Identifier (RNTI) and the second uplink/downlink configuration applies for a second type of RNTI.

8. The method of claim 1, wherein the first uplink/downlink configuration indicates resources for a downlink control channel and the second uplink/downlink configuration indicates resources for a data channel.

9. The method of claim 1, further comprising:
indicating, in a downlink control channel, whether to use the first uplink/downlink configuration or the second uplink/downlink configuration for data channel communication with a number of repetitions to the one or more UEs.

10. The method of claim 9, wherein one or more bits of downlink control information (DCI) indicate whether to use the first uplink/downlink configuration or the second uplink/downlink configuration.

11. The method of claim 9, wherein the downlink control channel indicates to use the second uplink/downlink configuration for a data channel, the method further comprising:
dynamically switching to the first uplink/downlink configuration at a beginning of a reconfiguration period.

12. The method of claim 9, further comprising:
transmitting a fallback indication identifying a switch to the first uplink/downlink configuration.

13. An apparatus for wireless communication at a base station, comprising:
memory; and
at least one processor coupled to the memory and configured to:
transmit a first uplink/downlink configuration for communicating with one or more User Equipments (UEs), wherein the first uplink/downlink configuration comprises a set of fixed resources configured for uplink communication without downlink resources for downlink communication or for downlink communication without uplink resources for uplink communication, wherein the set of fixed resources are configured for new radio (NR);
transmit a second uplink/downlink configuration for communicating with the one or more UEs, wherein the second uplink/downlink configuration comprises a flexible resource configuration configured for the uplink communication and the downlink communication, and wherein the first uplink/downlink configuration or the second uplink/downlink configuration indicates at least one valid resource for enhanced machine type communication (eMTC) communication or narrowband internet of things (NB-IoT) communication, wherein the flexible resource configuration is configured for the NR, wherein the first uplink/downlink configuration and the second uplink/downlink configuration comprise different time domain granularities or different periodicities; and
communicate the eMTC communication or the NB-IoT communication with at least one of the one or more UEs based on the at least one valid resource indicated in the first uplink/downlink configuration or the second uplink/downlink configuration.

14. The apparatus of claim 13, wherein the at least one valid resource is indicated using a bitmap.

15. The apparatus of claim 13, wherein the narrowband corresponds to a frequency range of a physical resource block (PRB).

16. A method of wireless communication at a User Equipment (UE), comprising:
receiving, from a base station, a first uplink/downlink configuration for a set of fixed resources configured for uplink communication without downlink resources for downlink communication or for downlink communication without uplink resource for uplink communication, wherein the set of fixed resources are configured for new radio (NR);
receiving, from the base station, a second uplink/downlink configuration comprising one or more flexible resources configured for the uplink communication and the downlink communication, and wherein the first uplink/downlink configuration or the second uplink/downlink configuration indicates at least one valid resource for enhanced machine type communication (eMTC) communication or narrowband internet of things (NB-IoT) communication, wherein the flexible resource configuration is configured for the NR, wherein the first uplink/downlink configuration and the second uplink/downlink configuration comprise different time domain granularities or different periodicities; and
communicating the eMTC communication or the NB-IoT communication with the base station using the at least one valid resource indicated in the first uplink/downlink configuration or the second uplink/downlink configuration.

17. The method of claim 16, wherein the at least one valid resource is indicated using a bitmap.

18. The method of claim 16, wherein the narrowband corresponds to a frequency range of a physical resource block (PRB).

19. The method of claim 16, wherein a subframe configured as an invalid subframe in the first uplink/downlink configuration is configurable as being at least partially valid in the second uplink/downlink configuration.

20. The method of claim 16, wherein the first uplink/downlink configuration is signaled using a first system information block (SIB) and the second uplink/downlink configuration is signaled using a second, cell specific SIB or radio resource control (RRC) signaling.

21. The method of claim 16, wherein if use of the second uplink/downlink configuration is indicated in system information, the second uplink/downlink configuration is valid for broadcast and unicast communication.

22. The method of claim 16, wherein the first uplink/downlink configuration applies for a first type of Radio Network Temporary Identifier (RNTI) and the second uplink/downlink configuration applies for a second type of RNTI.

23. The method of claim 16, wherein the first uplink/downlink configuration indicates resources for a downlink control channel and the second uplink/downlink configuration indicates resources for a data channel.

24. The method of claim 16, further comprising:
receiving an indication, in a downlink control channel, of whether to use the first uplink/downlink configuration or the second uplink/downlink configuration for data communication with a number of repetitions with the base station.

25. The method of claim 24, wherein one or more bits of downlink control information (DCI) indicate whether to use the first uplink/downlink configuration or the second uplink/downlink configuration.

26. The method of claim 24, wherein the downlink control channel indicates to use the second uplink/downlink configuration for a data channel, the method further comprising:
switching to the first uplink/downlink configuration at a beginning of a reconfiguration period.

27. The method of claim 24, further comprising:
receiving a fallback indication identifying a switch to the first uplink/downlink configuration; and
switching between the first uplink/downlink configuration or the second uplink/downlink configuration based on the fallback indication.

28. An apparatus for wireless communication at a User Equipment (UE), comprising:
memory; and
at least one processor coupled to the memory and configured to:
receive, from a base station, a first uplink/downlink configuration for a set of fixed resources configured for uplink communication without downlink resources for downlink communication or for downlink communication without uplink resource for uplink communication, wherein the set of fixed resources are configured for new radio (NR);
receive, from the base station, a second uplink/downlink configuration comprising one or more flexible resources configured for the uplink communication and the downlink communication, and wherein the first uplink/downlink configuration or the second uplink/downlink configuration indicates at least one valid resource for enhanced machine type communication (eMTC) communication or narrowband internet of things (NB-IoT) communication, wherein the flexible resource configuration is configured for the NR, wherein the first uplink/downlink configuration and the second uplink/downlink configuration comprise different time domain granularities or different periodicities; and
communicate the eMTC communication or the NB-IoT communication with the base station using the at least one valid resource indicated in the first uplink/downlink configuration or the second uplink/downlink configuration.

29. The apparatus of claim 28, wherein the at least one valid resource is indicated using a bitmap.

30. The apparatus of claim 28, wherein the narrowband corresponds to a frequency range of a physical resource block (PRB).

* * * * *